United States Patent
Zhang et al.

(10) Patent No.: US 10,496,423 B2
(45) Date of Patent: Dec. 3, 2019

(54) METHOD FOR OPENING UP DATA AND FUNCTIONS OF TERMINAL APPLICATION BASED ON RECONSTRUCTION TECHNOLOGY

(71) Applicant: Peking University, Beijing (CN)

(72) Inventors: Ying Zhang, Beijing (CN); Huaqian Cai, Beijing (CN); Gang Huang, Beijing (CN); Wei Yao, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 15/776,432

(22) PCT Filed: Sep. 23, 2016

(86) PCT No.: PCT/CN2016/099878
§ 371 (c)(1),
(2) Date: May 16, 2018

(87) PCT Pub. No.: WO2018/028027
PCT Pub. Date: Feb. 15, 2018

(65) Prior Publication Data
US 2019/0155628 A1    May 23, 2019

(30) Foreign Application Priority Data
Aug. 12, 2016  (CN) .......................... 2016 1 0663995

(51) Int. Cl.
*G06F 9/44* (2018.01)
*G06F 9/455* (2018.01)
(Continued)

(52) U.S. Cl.
CPC .......... *G06F 9/45525* (2013.01); *G06F 8/433* (2013.01); *G06F 8/70* (2013.01);
(Continued)

(58) Field of Classification Search
CPC ........ G06F 9/44; G06F 9/433; G06F 9/45508; G06F 9/4488; G06F 9/444843; G06F 8/70
See application file for complete search history.

(56) References Cited

U.S. PATENT DOCUMENTS

2019/0155628 A1*  5/2019  Zhang .................. G06F 9/4488

FOREIGN PATENT DOCUMENTS

| CN | 101620536 | * | 1/2010 | ............... G06F 9/44 |
| CN | 101847100 | * | 9/2010 | ............... G06F 9/44 |

OTHER PUBLICATIONS

Hwi Ahn et al., Reconstruction of Execution Architecture View Using Dependency Relationships and Execution Traces, ACM, 2018, retrieved online on Aug. 22, 2019, pp. 1417-1424. Retrieved from the Internet: <URL: http://delivery.acm.org/10.1145/3170000/3167284/p1417-ahn.pdf?>. (Year: 2018).*

* cited by examiner

*Primary Examiner* — Hanh Thi-Minh Bui
(74) *Attorney, Agent, or Firm* — SV Patent Service

(57) ABSTRACT

The invention discloses a method for opening up data and functions of device applications based on reconstruction technology. The method modifies the runtime environment of the application to obtain control flow information when the application function and data are used, to reconstruct the original control flow. This method conducts program analysis of run-time control flow and application static code, removes application function and data that are unrelated to sub-control flows, and retains a set of sub-control flows and contexts directly related to application functions and data. In certain context environment, the sub-set of the control flows are reconstructed to achieve respective application functions and to acquire the application data. The disclosed method can be used to open functions and data of applications based (Continued)

on Java, C++, and JavaScript, etc. on different types of devices. The present method is of great importance for application owners who need to open up application data, while faced with challenges of missing development documents and lacking developers.

6 Claims, 5 Drawing Sheets

(51) Int. Cl.
    *G06F 9/448*     (2018.01)
    *G06F 8/41*     (2018.01)
    *G06F 8/70*     (2018.01)
    *G06F 9/48*     (2006.01)

(52) U.S. Cl.
    CPC .............. *G06F 9/44* (2013.01); *G06F 9/4488* (2018.02); *G06F 9/45508* (2013.01); *G06F 9/4843* (2013.01)

METHOD FOR OPENING UP DATA AND FUNCTIONS OF TERMINAL APPLICATION BASED ON RECONSTRUCTION TECHNOLOGY

TECHNICAL FIELD

The present invention relates to the field of software technology for software maintenance, and in particular, to a method for opening up data and functions of the application on terminal devices. The method uses program analysis and reconstruction to convert data and functions of existing device applications to externally callable.

BACKGROUND OF THE INVENTION

The economy of application programming interface is an emerging driving force that can help corporate leaders to achieve corporate transformation, build new ecosystems, and monetize core assets to meet the market challenges in today's digital transformation process. Data and functions of the device applications feature a huge potential value, which deserve further development to realize their potential value. However, the data and functionality of open applications require developers to manually change and reconstruct the original system. For a large number of enterprises and government agencies, these are often accomplished by third-party development teams for custom applications, such as enterprise office applications, and smart city applications owned by the government, Although these enterprise applications comprise very important data and functions, the owners of big enterprises and government agencies do not have their own development teams, thus the third-party development teams need to reconnect with the development teams that developed the original device applications. Thus, they encounter the problems of high development costs and long development cycles.

In summary, there is a need for a method for supporting the conversion of data and functions of the existing device application into application programming interfaces. It can help application owners to quickly open the data and functionality of existing applications to outside even when there is a lack of development documentation and developers. The disclosed method uses program analysis and reconstruction to convert data and functions of existing device applications, which can efficiently reuse the original application code to quickly generate the corresponding application programming interface for the data and functions of the existing application.

SUMMARY OF THE INVENTION

The purpose of the present invention is to provide an external interface for data and functions of existing applications in order to provide services. The core idea is to modifying the run environment of the application, to access data flow information for application runtime control when users use the corresponding functions in the applications, and to reconstruct the original control flow. This method uses programmatic analysis of runtime control flows and application static codes to strip off sub-control flows that are independent of application's functions and data. For example, implement sub-control flow of user interface (UI); retain a group of sub-control flows and the context that are directly related to application's functions and data. In the particular context, the group of sub-set of the control flow is reconstructed to implement the respective functions of the application and to acquire the application's data.

The disclosed method monitors the level of the application execution environment in order to acquire the application-specific function used by the user, and to obtain the runtime control flow for the specific data of the application. The disclosed method conducts analyzes on the control flow and the static code, and separates off the sub-control flows that are unrelated to the application's functions and data to enhance the efficiency of the external interface. The disclosed method reproduces the specific context in the level of the application execution environment, and reconstructs the original application codes to ensure application's functions, which results in accuracy of the application data.

The technical scheme adopted by the invention is as follows:

A method for opening up data and functions of device applications based on a reconstruction technique includes the following steps:

1) the application owner specifies data and functions in a device application to be provided at an external interface;

2) acquiring control flows corresponding to the level of the application runtime environment to acquire a group of control flows and runtime context for the data and functions specified in step 1);

3) conducting programmatic analyses of the control flows and the runtime context acquired in step 2), generating context dependency for each function in the control flows and wake relationship between the group of control flows;

4) using the analysis result obtained in step 3) to reconstruct the group of control flows of the application acquired in step 2), generating a set of externally callable application programming interface (API); and 5) opening the functions and data of the original application by calling the functions and data via the API generated in step 4).

Further, control flows corresponding to the level of application runtime environment in step 2) can be a set of ordered functional calls.

Further, the runtime context in step 2) comprises call parameter of each of the functions in the control flow and data that each of the functions reads from and writes into a memory.

Further, the step of acquiring the control flow for the level of the application runtime environment in step 2) can include:

a) modifying the memory management of the application runtime environment to support runtime serialization of the data (i.e., context) in memory;

b) modifying modules related to function calls in the application runtime environment to support recording of function call sequence (i.e. control flow) during runtime; and c) running the corresponding application in the application runtime environment implemented in steps a) and b) to obtain a runtime control flow and serialized context information corresponding to the functions and data.

Further, the step of conducting programmatic analyses in step 3) includes:

a) using bytecode or code of the application as input, conducting static analysis to determine data dependence of each function, combining the run-time context information, mapping results of the static analysis to each function in the control flows, and generating a dependence of each function with the context data in the control flows; and b) using handover functions associated with the control flows as input, analyzing the switching among the control flows, generating wake relationships between the control flows, constructing a control flow across a plurality of threads.

Further, the step of reconstructing the group of control flows of the application in step 4) can include:

a) dividing functions in the control flows into three categories based on external behaviors of the functions: 1. the ones associated with the user interface; 2. the ones associated with the computation logic; 3. the ones related to input and output;

b) conducting program analysis to divide the control flows into sub-control flows respectively related to the user interface, computation logic, and inputs and output, providing initial examples of context to each of the sub-control flows, that is, the parameters of the call functions for the sub-control flows and the dependent data in the memory; and c) a developer selects suitable sub-control flow according to the examples in step b), transforming the application functions and data to obtain a set of externally callable APIs.

The present invention discloses a method of transforming functions and data of existing applications to external interfaces in order to provide service. The method can help to automatic acquire control flow and runtime context and to reconstruct the original control flow even when there is a lack of development documentation and developers. The invention combines the advantages of the different technologies and innovatively combines the control flow analysis with the static code analysis, removes the sub-control flows unrelated to the application's function and data to improve the efficiency of the generated external interface.

Meanwhile, the disclosed method uses the level of the application runtime environment to reproduce the specific context environment, to reconstruct the original application code to ensure application's functions and accuracy of the acquired application data.

BRIEF DESCRIPTION OF THE DRAWINGS

FIG. 3A shows the original control flow of the application. FIG. 3B shows the control flow after the reconstruction driven by API generation efficiency. FIG. 3C shows the control flow after the reconstruction driven by API execution efficiency.

DETAILED DESCRIPTION OF IMPLEMENTATIONS

Figure 1:
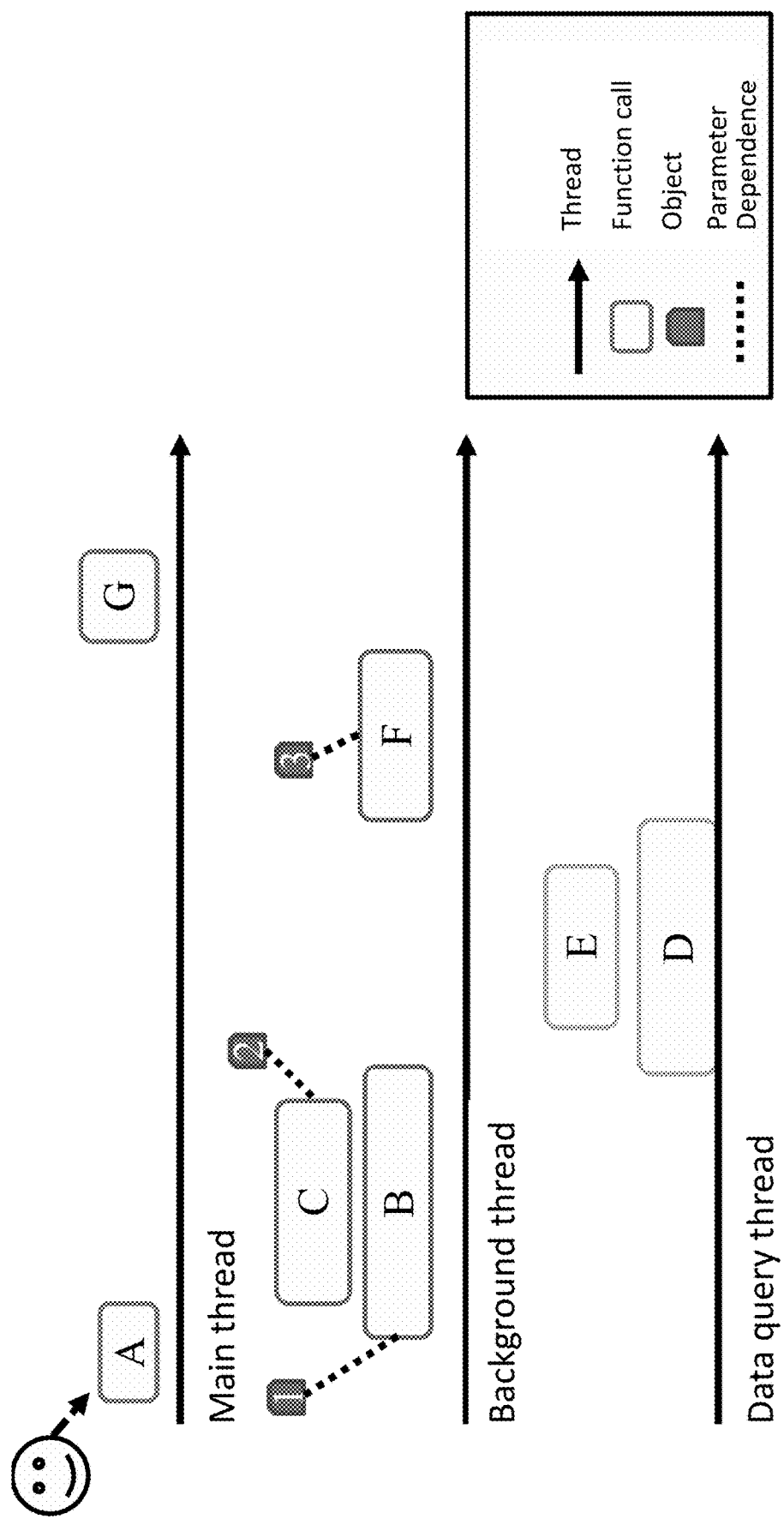
FIG. 1 is an example of an acquired original control flow.

In order to make the above objects, features, and advantages of the present invention more comprehensible, the present invention will be further described below through specific embodiments and the accompanying drawings.

The present invention discloses a method of transforming functions and data of existing applications to external interfaces in order to provide service. The method comprises three parts: 1. acquiring application runtime control flows and the associated execution context; 2. data dependency in the control flows and wake relationships of the control flows; 3. the method of reconstructing application control flows. The core idea of the application is by modifying the original control flows of the application, to retain the core logic of application processing functions, to correctly and efficiently transform functions and data of existing applications to external interfaces to achieve the goal of providing services.

The specific technical solution of the present invention is as follows:

(1) A method of acquiring application runtime control flows and the associated execution context.

The control flows in the application execution environment is a set of ordered functional calls. The Frame structure in the application runtime environment is modified to support the recording of runtime function call sequence (i.e. control flow). Each function call in the set of control flows includes corresponding runtime context. The runtime context consists of two parts: 1. the parameters for each function call; and 2. all the data in the global stack shared by the functions. To obtain the above-described context, to serialize the runtime data in the Stack and Heap (i.e. context) the stack. After the above described modification in the application running in the runtime environment, the method can obtain the context information about the runtime control flows that use the specific functions and data after serialization.

(2) A method of generating relationships between application control flows and function data dependency.

In addition to the basic control flow, the method also needs data dependency for each function in the control flows and the wake relationships between the control flows, in order for the developers to understand the full control flow, and to reproduce context in the control flows. Bytecode or code of the application is as input, static analysis method is used to analyze data dependence of each function, and in conjunction with the run-time context information, to map results of the static analysis to each function in the control flow, and to generate a dependence of each function in the control flows with the context data.

Secondly, the functions associated with wake relationships in the control flows are used as input, the wake relationships among different control flows are analyzed to construct control flows across multiple threads.

(3) A Method of Reconstructing Application Control Flows

Control flow can be divided into three parts: user interface related, ones related to computation-logic and files, and ones related to network and other input and output. Using the control flow constructed in (2), developers can reconstruct the original control flow for different goals.

In one aspect, developers can set the goal of generation efficiency for application programming interface, to reconstruct the original control flow. Part of the application associated with the user interface is often read input and present output, which are not convenient for developers to read and easy to understand. Thus, using the original control flow as basis, read and write functions are added to the user interface, which can quickly achieve the application programming interface function for desired data and functional packages. The APIs generated in this way tend to be more complex due to the need to implement calculations of rendering the user interface. In some cases, the execution efficiency is low, making it difficult to meet the high volume simultaneous API calls.

On the other hand, developers can also reconstruct the original control flow with the goal of execution efficiency at the APIs. Essentially, the function of the user interface related of the entire flow control is only to provide input and output, which can be completely removed. The functions associated with the input and output must often be retained (except for the type of the log output). One possible scheme for control flow reconstruction is to keep the indispensable functions and functions related to computation logic.

The context information for different schemes of control flow reconstruction differ to a certain degree. Using the degree of complexity of the context as an indicator, developers can identify a practical and efficient scheme for control flow reconstruction.

Example

This section describes the implementation of functions and data in open Android applications. The following uses a query data function as an example to introduce examples of the reconstruction process and the reconstructed runtime architecture.

The runtime environment of the Android application, Android Runtime, is modified to support the acquisition of runtime control flow the application and the associated context. In particular, the data memory of the Android Runtime uses objects as units and is stored in a Heap data structure. The application's query function is used on the modified Android Runtime, to obtain the control flow related to the query. As shown in FIG. 1, rectangles with rounded corners and letters in the middle represent function calls. The stacked function calls indicate that the call relationships between the functions, for example, function B has called function C (i.e. a C function call is generated). Hexagons represent objects during runtime. The dashed lines between the object and the function call indicate that the function call uses the object as a parameter. The control flow in FIG. 1 relates to a user clicking a query at a user interface to trigger the main thread to call function A. Function A acquires the input at the user interface (object 1), wakes up the background thread, and calls the B function to further process the input data. Immediately, the main thread enters a sleep state. Subsequently function B calls function C to construct the corresponding data query (object 2), and wakes up the data query thread to call function D to initiate a query. The background thread goes back to sleep. Function D calls the query results of function E, re-awakens the background thread. Function F organizes the output of E (Object 3) and wakes up call to the main thread. On the one hand, the above described acquired control flow information lacks data-dependent function calls, such as static fields (Static Field) for read and write, etc., which makes it difficult for developers to reproduce the full context of the run-time environment, making it impossible to generate the correct API. On the other hand, the control flow information obtained also lack wake relationship between threads, resulting five separate control flows illustrated in FIG. 1, rather than an integrated control flow.

Figure 2:
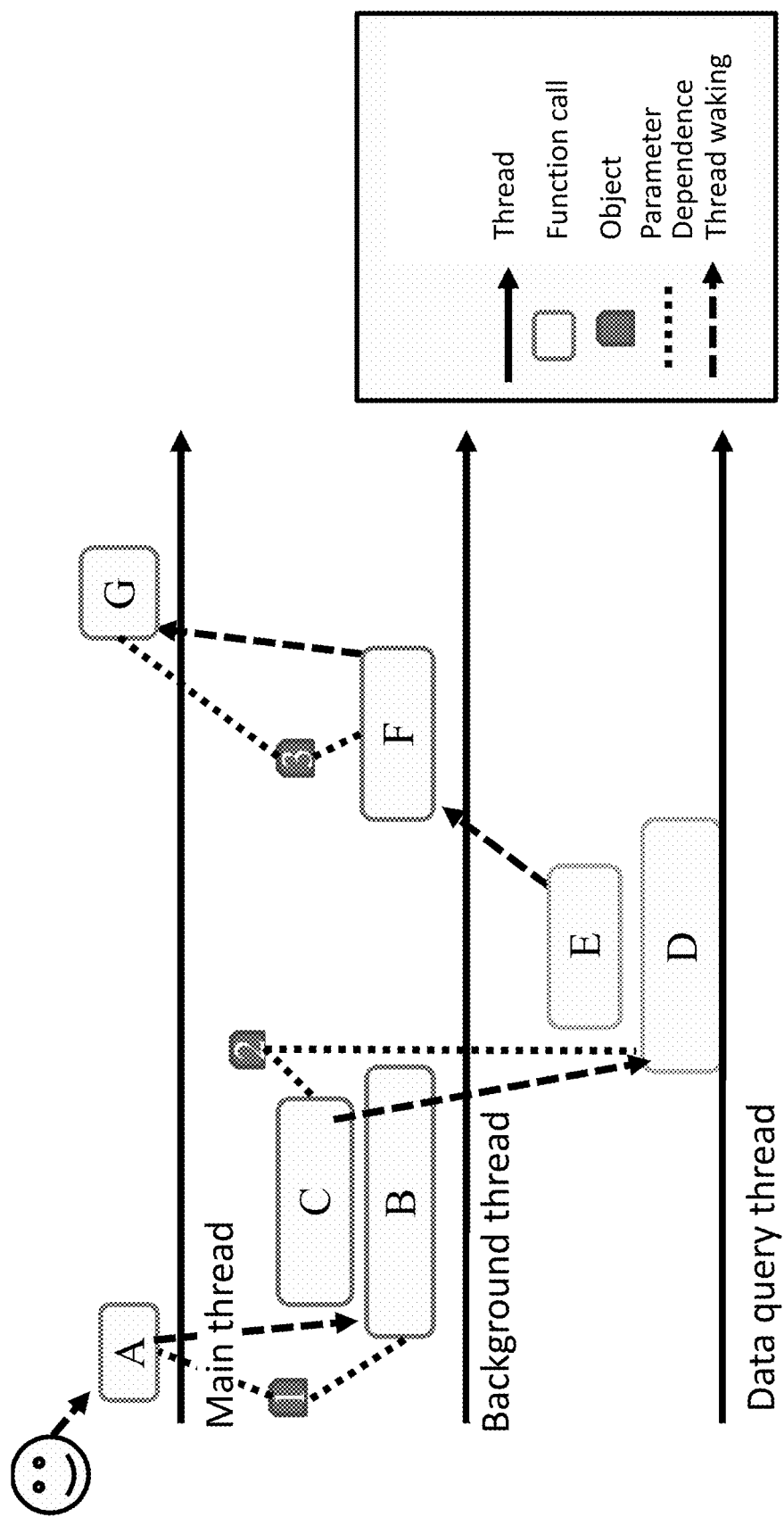
FIG. 2 is an example of a control flow that supplements the data dependence of a function and the awake relationship between control flows.

To address the issues described above, we use Dalvik bytecode format in Android application as input, conduct static program analysis, to determine data dependence of each function, and combines with runtime context, to more accurately describe the data dependency of function calls in the acquired control flows. Secondly, we use functions associated with the thread wakes in the control flows as an input, to construct wake-relationships between the control flows. Finally, the control flow complemented with the function data dependency and the awake relationship between threads is derived, as shown in FIG. 2. Developers can use this control flow to start reconstructing the control flow.

Figure 3A:
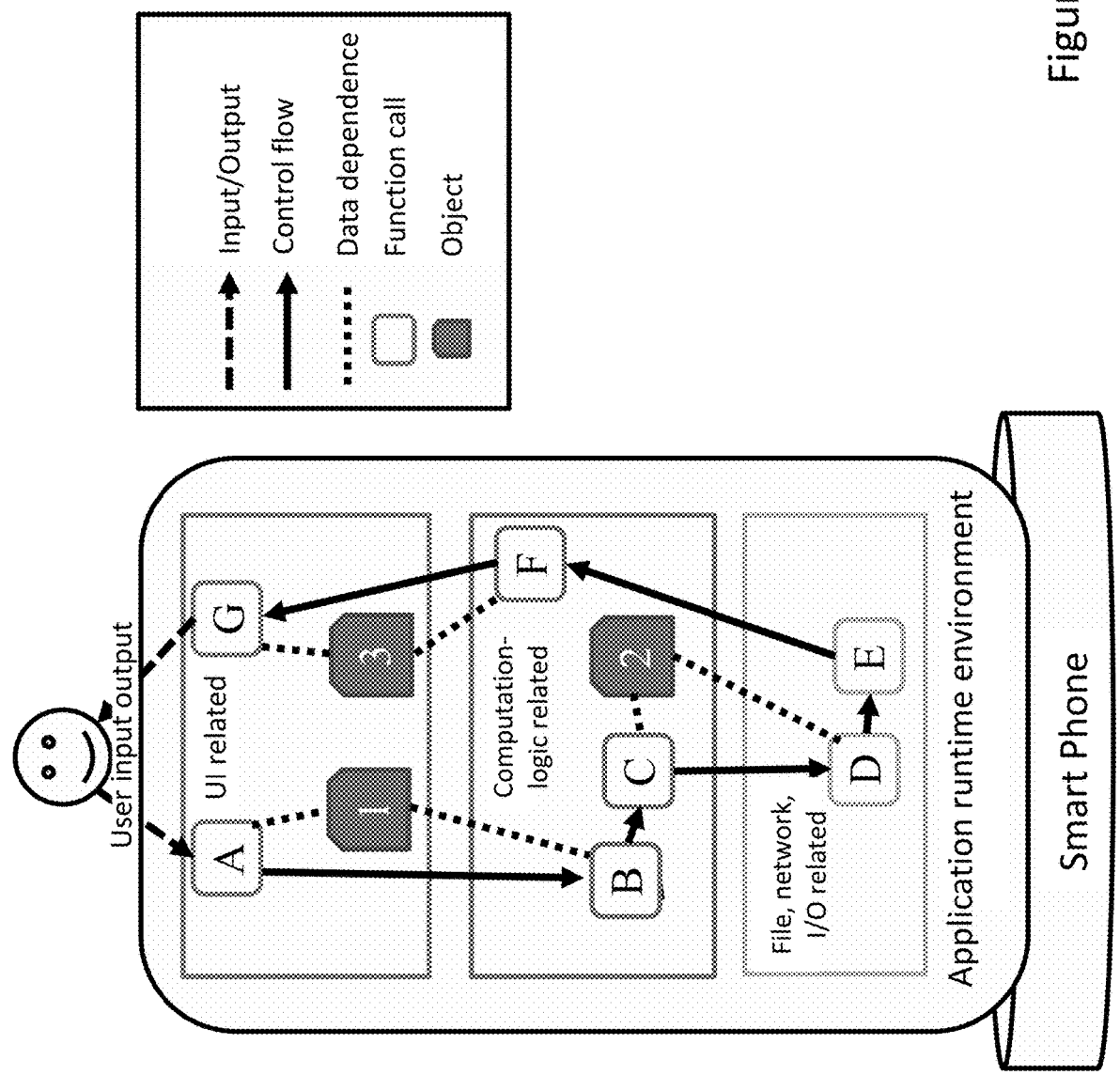
FIG. 3A, FIG. 3B, and FIG. 3C show examples of control-flow reconstruction methods.

As described in the above specific implementation scenario, we divide the control flow into three parts: ones related to user interface, ones related to computation logic and files, and ones related to network and other input and output. The control flow can be simplified as shown in FIG. 3A.

Figure 3B:
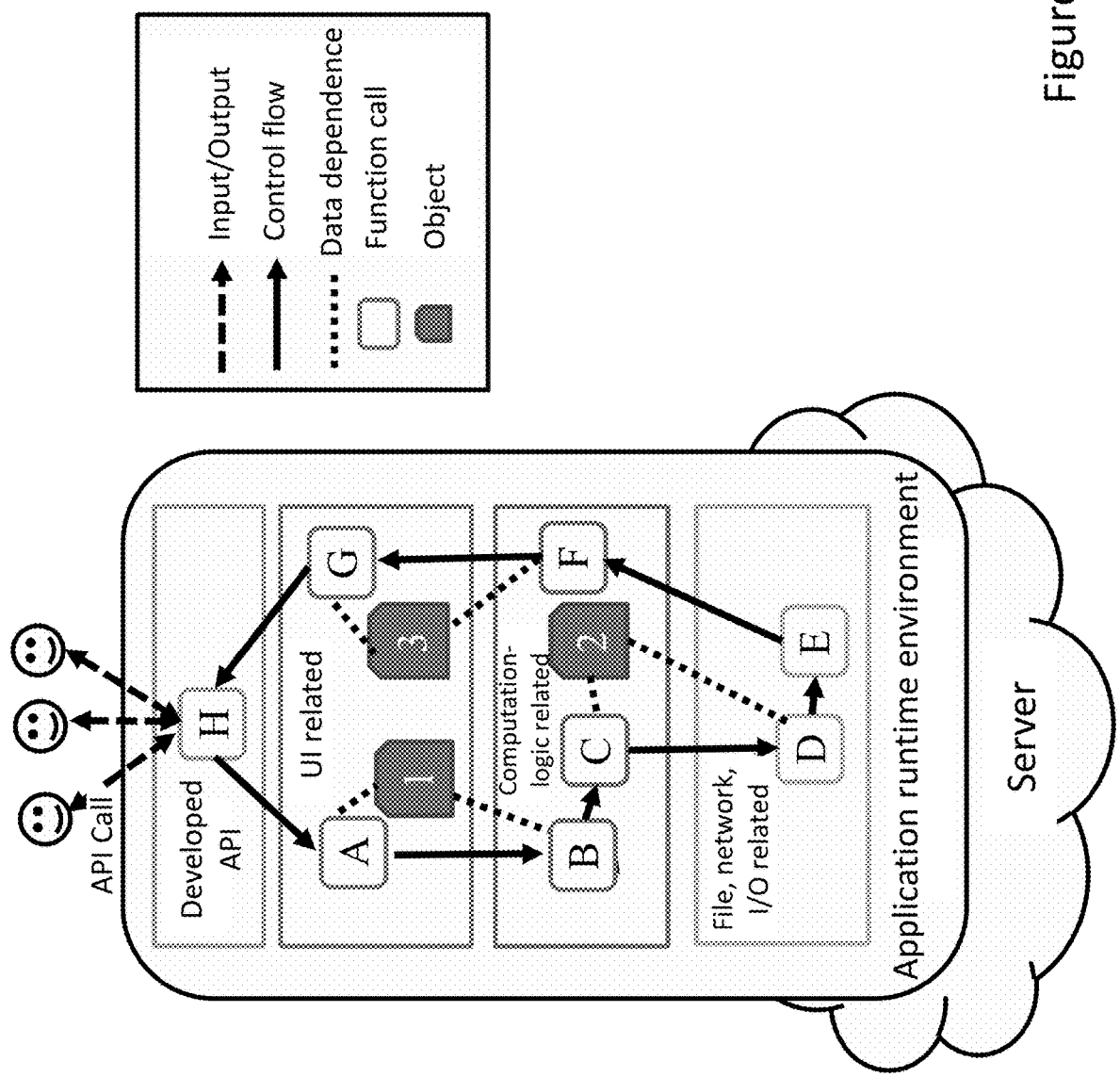

A control flow reconstruction scheme with the goal of API generation efficiency is shown in FIG. 3B. The reconstruction scheme is based on the original control flow, with the addition of read and write operations (H function) for elements at the user interface, to complete the required API.

Figure 3C:
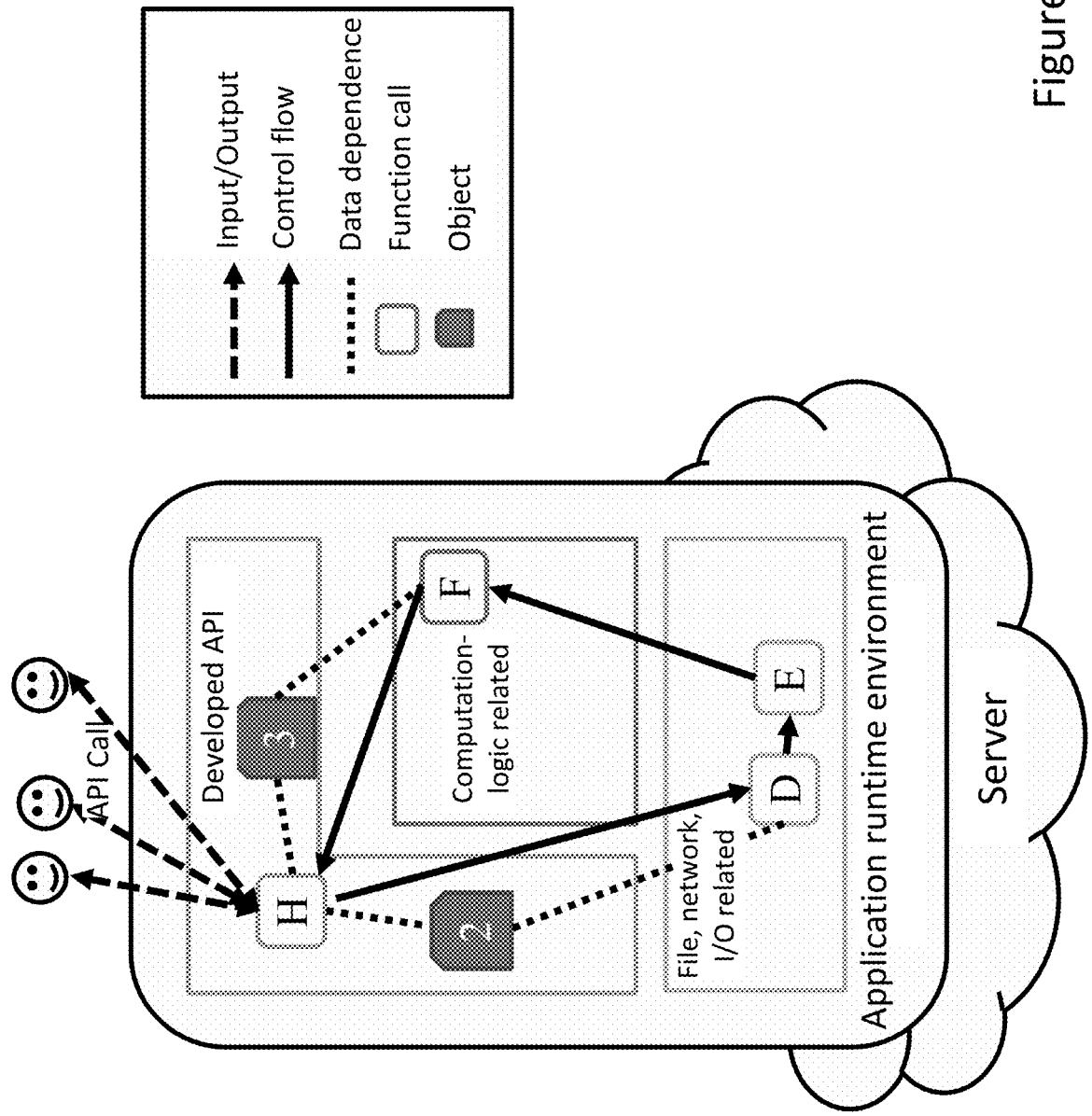

A scheme for reconstructing control flow with the goal of API execution efficiently is shown in FIG. 3C. The reconstruction scheme completely removes function call (function A and function G) related to the user interface and portions of the input data processing logic (function B and function C). The core database query logic (functions D and E) and the output processing logic (F-function) are retained. The developers can use the acquired context of the original control flow to construct the context environments for three functions (object 2), which obtains an external callable API constructed for query functions.

In some cases, the functions selected by developers have complex data dependencies, for example, using runtime dynamic link library to call the native C/C++ code, and rely on the data of Android Runtime in C/C++ code. In these situations, the disclosed method can be implemented to run the Android virtual machine in a virtualized manner on the server side to reconstruct a complex context and to assure guarantee the accuracy of the control flow after the reconstruction.

The above examples are described using Android application and Android Runtime. The method is also suitable for different for runtime environments, and different byte code, source code, and intermediate codes, such as, Net framework application and associated runtime, Java applications and Java virtual machine, Javascript application, and JS interpreter and corresponding implementations.

The above embodiments are only used to illustrate the technical solutions of the present invention and are not limited thereto. Those skilled in the art may modify or equivalently substitute the technical solutions of the present invention without departing from the spirit and scope of the present invention. The scope of protection shall be subject to the provisions of the claims.

What is claimed is:

1. A method of opening data and function of device applications based on reconstruction, comprising:
   1) specifying data and functions in an application on a device to be provided at an external interface;
   2) acquiring control flows corresponding to a level of runtime environment of the application to acquire a group of control flows and runtime context for the data and the functions specified in step 1);
   3) conducting programmatic analyses of the control flows and the runtime context acquired in step 2), generating context dependency for each function in the control flows and wake relationship between the group of control flows, wherein the step of conducting programmatic analyses in 3) further comprises:
      a) using bytecode or code of the application as input, conducting static analysis to determine data dependence of each function, combining the run-time context information, mapping results of the static analysis to each function in the control flows, and generating a dependence of each function with the context data in the control flows; and
      b) using handover functions associated with the control flows as input, analyzing switching among the control flows, generating wake relationships between the control flows, and constructing a control flow across a plurality of threads;

4) using result of the programmatic analyses obtained in step 3) to reconstruct the group of control flows of the application acquired in step 2), generating a set of externally callable application programming interface (API); and 5) opening the functions and data of the original application by calling the functions and data via the API generated in step 4).

2. The method of claim 1, wherein the control flows corresponding to the level of application runtime environment in step 2) comprises a set of ordered functional calls.

3. The method of claim 1, wherein the runtime context in step 2) comprises call parameter of each of the functions in the control flow and data that each of the functions reads from and writes into a memory.

4. The method of claim 1, wherein the step of acquiring control flows corresponding to a level of runtime environment of the application in step 2) further comprises:
   a) modifying the memory management of the application runtime environment to support runtime serialization of the data in memory;
   b) modifying modules related to function calls in the application runtime environment to support recording of a sequence of the function call during runtime; and
   c) running the application in the application runtime environment implemented in steps a) and b) to obtain a runtime control flow and serialized context information corresponding to the functions and data.

5. The method of claim 4, wherein in step 2) a frame structure of the application execution environment is modified to support recording of a sequence of ordered function calls, wherein Stack and Heap data structures in the application runtime environment are modified to support context serialization of the stack and Heap data structures.

6. A method of opening data and function of device applications based on reconstruction, comprising:

1) specifying data and functions in an application on a device to be provided at an external interface;

2) acquiring control flows corresponding to a level of runtime environment of the application to acquire a group of control flows and runtime context for the data and the functions specified in step 1);

3) conducting programmatic analyses of the control flows and the runtime context acquired in step 2), generating context dependency for each function in the control flows and wake relationship between the group of control flows;

4) using result of the programmatic analyses obtained in step 3) to reconstruct the group of control flows of the application acquired in step 2), generating a set of externally callable application programming interface (API), wherein the step of reconstruct the group of control flows in step 4) further comprises:
   a) dividing functions in the control flows into three categories associated with the user interface, the computation logic, or input and output;
   b) conducting program analysis to divide the control flows into sub-control flows respectively related to the user interface, computation logic, and inputs and output, providing examples of context to each of the sub-control flows, which includes parameters of the call functions for the sub-control flows and dependent data in the memory;
   c) selecting suitable sub-control flow according to the examples in step b), and transforming the functions and data in the application to a set of externally callable APIs; wherein in step 4) the control flows are reconstructed to maximize API generation efficiency or to maximize API execution efficiency; and 5) opening the functions and data of the original application by calling the functions and data via the API generated in step 4).

* * * * *